United States Patent [19]

Bentley

[11] Patent Number: 5,011,081
[45] Date of Patent: Apr. 30, 1991

[54] IRRIGATION SYSTEM HAVING UNDERHEAD SPRINKLER VALVE

[76] Inventor: Carl J. Bentley, 1321 S. Bowen, Longmont, Colo. 80501

[21] Appl. No.: 393,668

[22] Filed: Aug. 11, 1989

[51] Int. Cl.⁵ ............................................. F16K 31/12
[52] U.S. Cl. .................................. 239/569; 239/201; 251/30.02
[58] Field of Search .................... 251/30.05, 30.02; 239/66, 99, 201, 63, 202, 203, 204, 205, 569, 67

[56] References Cited

U.S. PATENT DOCUMENTS

| | | | |
|---|---|---|---|
| 1,428,553 | 9/1922 | Oakes | 239/204 |
| 1,776,455 | 9/1930 | Thompson . | |
| 2,989,247 | 6/1961 | Tropeano et al. | 239/206 |
| 3,033,467 | 5/1962 | Hoffer | 239/204 |
| 3,063,645 | 11/1962 | Tropeano et al. | 239/206 |
| 3,090,592 | 5/1963 | Fleer | 251/30.05 |
| 3,323,725 | 6/1967 | Hruby, Jr. | 239/205 |
| 3,408,006 | 10/1968 | Stanwood | 239/66 |
| 3,637,139 | 1/1972 | Felix | 239/206 |
| 3,674,210 | 7/1972 | Faragasso | 239/204 |
| 3,713,584 | 1/1973 | Hunter | 239/206 |
| 3,762,437 | 10/1973 | King, Sr. | 239/201 |
| 3,929,288 | 12/1975 | Brusadin et al. | 239/201 |
| 3,934,820 | 1/1976 | Phaup | 239/205 |
| 3,964,685 | 6/1976 | Chauvigne | 239/66 |
| 4,201,362 | 5/1980 | Nishimi et al. | 251/30.05 |
| 4,729,511 | 3/1988 | Citron | 239/205 |
| 4,913,351 | 4/1990 | Costa | 239/203 |

OTHER PUBLICATIONS

Rain Bird Brochure from Golf Equipment Magazine, p. 99, Model No. 91DR, no date.

*Primary Examiner*—Andres Kashnikow
*Assistant Examiner*—Christopher G. Trainor
*Attorney, Agent, or Firm*—Brian D. Smith

[57] ABSTRACT

An irrigation system having a valve assembly which is attachable to the underside of a sprinkler head is disclosed. The valve assembly includes a housing having interior walls which define an inner chamber, an inlet in fluid communication with the inner chamber, an outlet in fluid communication with the inner chamber and a valve seat surrounding the entrance of the outlet. The valve assembly further includes a flexible diaphragm which extends across the inner chamber and is attached to the interior walls of the housing so that it divides the inner chamber into an upper chamber and a lower chamber wherein the upper chamber is in fluid communication with the inlet and the outlet. The valve assembly further includes valve closing structure located in the upper chamber and attached to the diaphragm for opening and closing the valve to control fluid flow through the valve. The valve assembly further includes structure for remotely controlling fluid pressure in the lower chamber to deflect the diaphragm upwardly and downwardly for purposes of moving the valve closing structure in and out of sealing engagement with the valve seat to open and close the valve assembly.

16 Claims, 3 Drawing Sheets

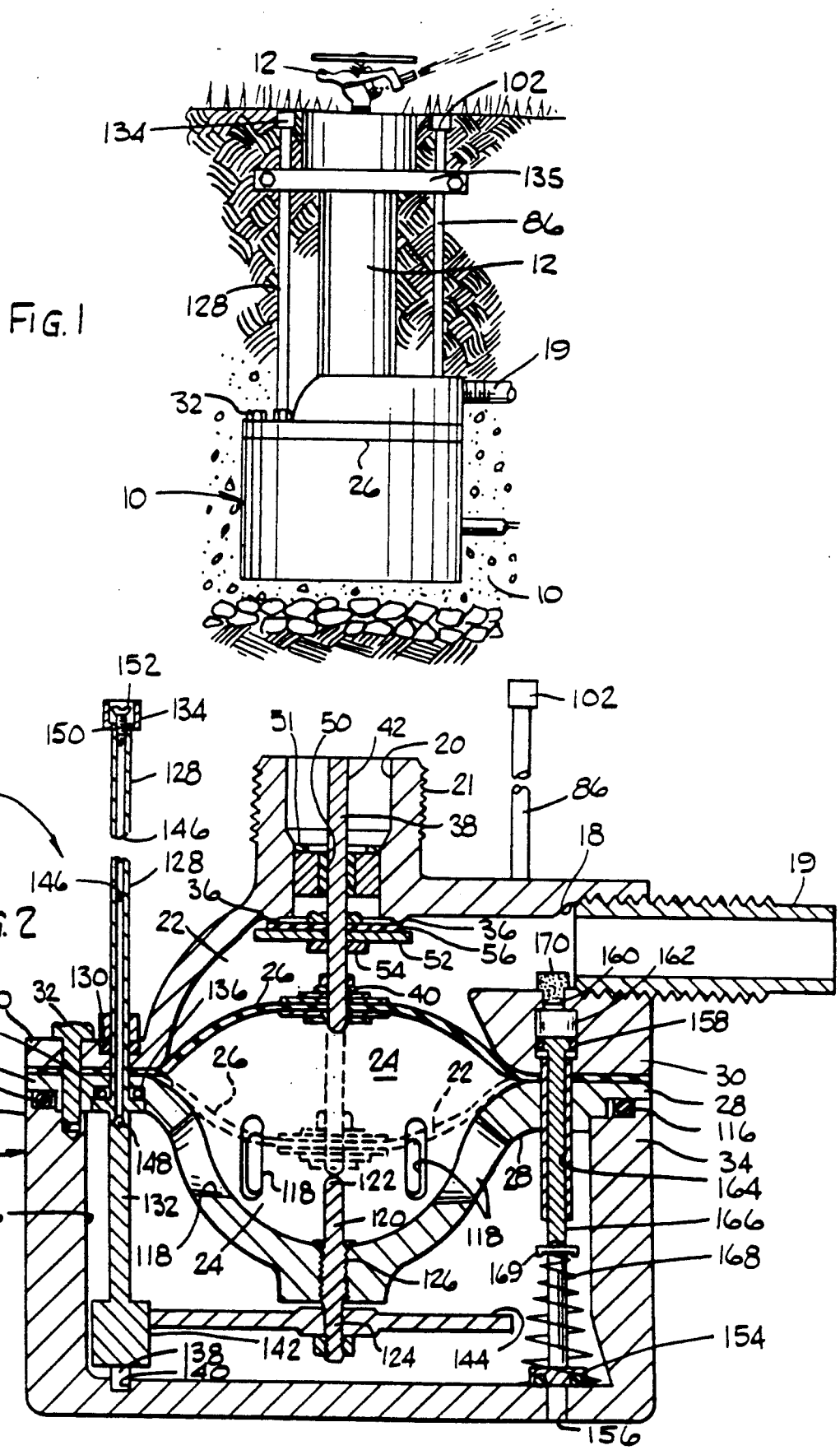

IRRIGATION SYSTEM HAVING UNDERHEAD SPRINKLER VALVE

TECHNICAL FIELD

The invention relates generally to irrigation systems and, more particularly, to turf sprinkler irrigation systems such as those typically installed in parks, golf courses, etc.

BACKGROUND ART

The present invention was prompted by the fact that, as far as is known, no valve or valve assembly has been developed for attachment to the underside of a sprinkler head which enables fluid flow through the valve to be remotely controlled. There are, however, sprinkler heads available which have a remote control valve built into the side of the sprinkler head. Two examples of these are the Rainbird Model 91DR available from Rainbird Sales Inc. of Glendora, California and the Toro Model No. 690 available from the Toro Co. of Riverside, California.

The problem with incorporating a remotely controllable valve into the sprinkler head is that it makes it unnecessarily expensive to remotely control an existing (i.e. non-remotely controlled) irrigation system since each existing sprinkler head in an irrigation system must be replaced with a remotely controlled sprinkler head such as one of those available from Toro or Rainbird. It would be much more economical if an irrigator could simply attach a remotely controllable valve to each of the existing sprinkler heads in the irrigation system. Accordingly, it would be highly desirable if an inexpensive, remotely controlled, fluid flow control valve were available that could be used with most existing, commercially available sprinkler heads.

DISCLOSURE OF THE INVENTION

The present invention addresses the aforementioned needs by providing an irrigation system which utilizes a remotely controlled, fluid flow control valve or valve assembly which is connectable to the underside of virtually every commercially available sprinkler head. The valve assembly includes a housing having interior walls which define an inner chamber, an inlet, an outlet in fluid communication with the inner chamber and a valve seat surrounding the entrance of the outlet. The housing further includes a flexible diaphragm extending across the inner chamber and being attached to the interior walls thereof so that it divides the inner chamber into an upper chamber and a lower chamber wherein the upper chamber is in fluid communication with the inlet and the outlet. The valve assembly further includes valve closing means located in the upper chamber and attached to the diaphragm. The valve closing means is capable of sealing engagement with the valve seat to stop fluid flow through the outlet. The valve assembly further includes means for remotely controlling fluid pressure in the lower chamber to deflect the diaphragm upwardly and downwardly for purposes of moving the valve closing means in and out of sealing engagement with the valve seat, thereby opening and closing the valve assembly.

In a preferred embodiment of the invention, the means for remotely controlling fluid pressure in the lower chamber includes a first channel defined by the housing which is in fluid communication with the inlet, the outlet and the lower chamber. The remote control means also includes an on/off remotely controlled valve, preferably a solenoid activated valve, which is located in the first channel between the outlet and the lower chamber. When activated to open, the remotely controlled valve lowers fluid pressure in the lower chamber by enabling fluid in the lower chamber to escape to the outlet via the first channel. By lowering fluid pressure in the lower chamber, the diaphragm deflects inwardly towards the lower chamber, thereby opening the valve assembly to permit fluid flow through the valve. To stop fluid flow through the valve, fluid pressure in the lower chamber is raised which causes the diaphragm to deflect inwardly or upwardly into the upper chamber, thereby closing the valve. Fluid pressure in the lower chamber is raised by closing the remotely controlled valve which stops fluid from escaping out of the lower chamber via the first channel. As such, fluid from the fluid source connected to the valve flows into the lower chamber thereby raising fluid pressure in the lower chamber which causes the diaphragm to deflect into the upper chamber and close the valve assembly.

The present invention also includes means for controlling, preferably restricting, the flow of fluid through the first channel. Such control or restriction of fluid flow through the first channel may be necessary if in-line fluid pressure is so high that it prevents fluid from escaping from the lower chamber when the remotely controlled valve is opened.

In addition, the present invention provides manual operation means for manually opening the valve should the remotely controlled valve fail. The manual operation means includes a second channel defined by the housing and a manual operable flow control means located in the second channel for controlling the flow of fluid through the second channel. The second channel is in fluid communication with the first channel at a location between the inlet and the remotely controlled valve. The second channel is also in fluid communication with the first channel at a location between the remotely controlled valve and the outlet. The flow control means located in the second channel is capable of being manually opened to permit fluid flow through the second channel to the outlet. As such, if the remotely controlled valve fails in its closed position, fluid pressure in the lower chamber can still be reduced by manually opening the flow control means located in the second channel which permits fluid to escape from the lower chamber to the outlet via the first and second channels.

A particularly preferred embodiment of the present invention includes dual needle valve means for controlling fluid flow through the first and second channels. The dual needle valve means includes an inner needle valve for controlling fluid flow through the first channel and an outer needle like sleeve for controlling fluid flow through the second channel. The outer needle-like sleeve defines a cylindrical, threaded chamber for threadably receiving the inner needle valve so that the inner needle valve and the outer needle-like sleeve are coaxially aligned with one another and are capable of axial movement with respect to each other. Further description of the dual needle valve means is provided below in the description of the best mode.

The present invention also includes means for bleeding air out of the lower chamber and means for draining the lower chamber of fluid when fluid pressure in the upper chamber drops below a predetermined level which, for example, would typically occur when the flow of fluid to the valve is shut off.

The invention also includes means for limiting or controlling deflection of the diaphragm into the lower chamber. This enables control over the volume of fluid flowing through the valve assembly when it is opened. It also helps prevent rupturing of the diaphragm.

BRIEF DESCRIPTION OF THE DRAWINGS

Other features of this invention will appear in the following description and appended claims, reference being made to the accompanying drawings forming a part of the specification where like reference characters designate corresponding parts in the views.

FIG. 1 is a side elevational view of a remote controllable valve mounted in the ground on the underside surface of a sprinkler head.

FIG. 2 is cross-sectional view taken along Lines 2—2 of FIG. 4.

FIG. 5 is an enlarged partial view of FIG. 3.

BEST MODE FOR CARRYING OUT THE INVENTION

Figure 3:
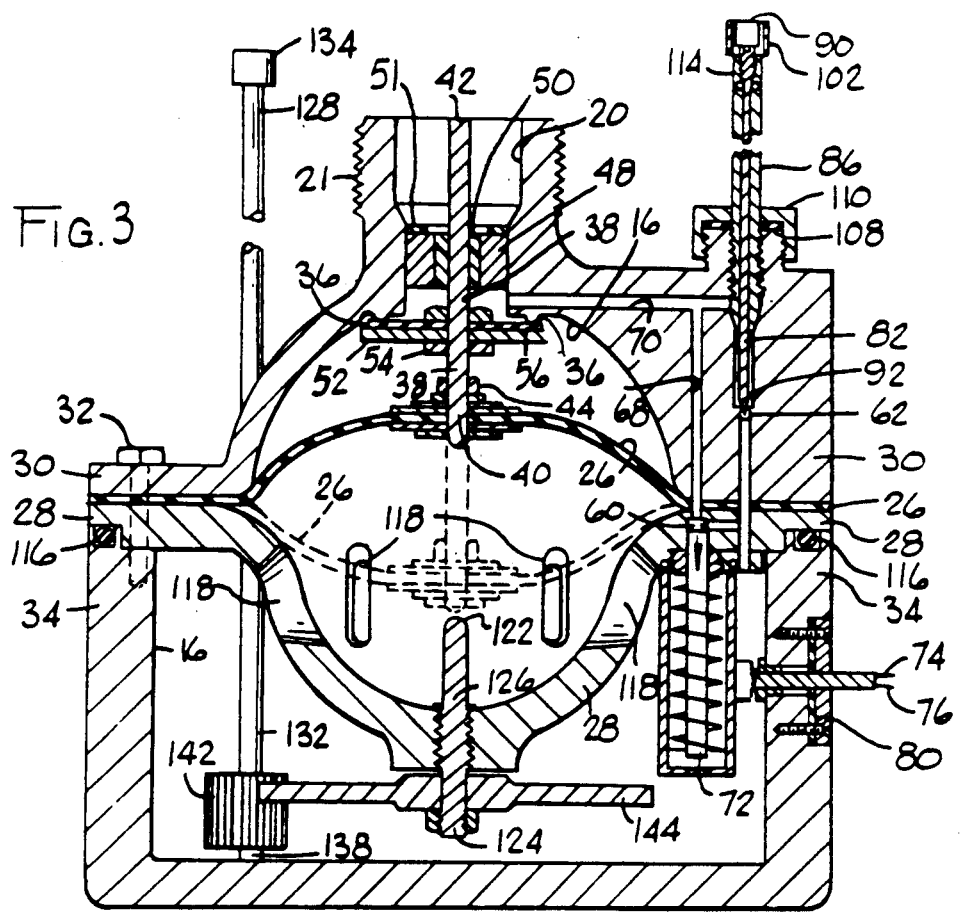
FIG. 3 is a cross-sectional view taken along Lines 3—3 of FIG. 4.

FIG. 1 illustrates a remote controllable, valve assembly 10 of the present invention (also referred to herein as underhead valve 10) which is connected to the underside of a sprinkler head 12. While only one sprinkler head is illustrated in the figures, it should be understood that underhead valve 10 is connectable to virtually all commercially available sprinkler heads, thereby rendering virtually all commercially available sprinkler heads remote controllable.

FIGS. 2 through 5 illustrate the details of underhead valve 10. As illustrated, valve 10 includes a valve housing 14 having interior walls 16 which define an inner chamber (not numbered), an inlet 18 and an outlet 20 in fluid communication with the inner chamber. Inlet 18 is threadably engaged with a fluid supply or water line 19 so as to be fluid communication therewith. Valve housing 14 also defines a male threaded portion 21 for connecting the valve (i.e. outlet 20) to the underside of sprinkler head 12. As such, outlet 20 is in fluid communication with sprinkler head 12.

Valve 10 also includes a flexible diaphragm 26 which divides the aforementioned inner chamber into an upper chamber 22 and a lower chamber 24. Diaphragm 26 which is preferably made of nylon reinforced buna-n rubber extends across the entire inner chamber and it is sealably attached to the interior walls 16 of housing 14 by sandwiching it between a diaphragm retainer 28 (to be explained in more detail herein) and an upper half 30 of housing 14. The sandwiched members are held together by bolt means 32 which bolt the upper half 30 and the sandwiched members to a lower clamp half 34 of housing 14. Suitable bores are provided through upper half 30 and the sandwich members for receiving bolt means 32. Suitable threaded bores (not numbered) are provided in the lower clamp half 34 for threadably receiving the bolt means. When bolt means 32 are tightened, diaphragm 26 is tightly secured to the interior walls of housing 14. Accordingly, fluid in upper chamber is incapable of entering lower chamber 24 through or around diaphragm 26.

Figure 4:
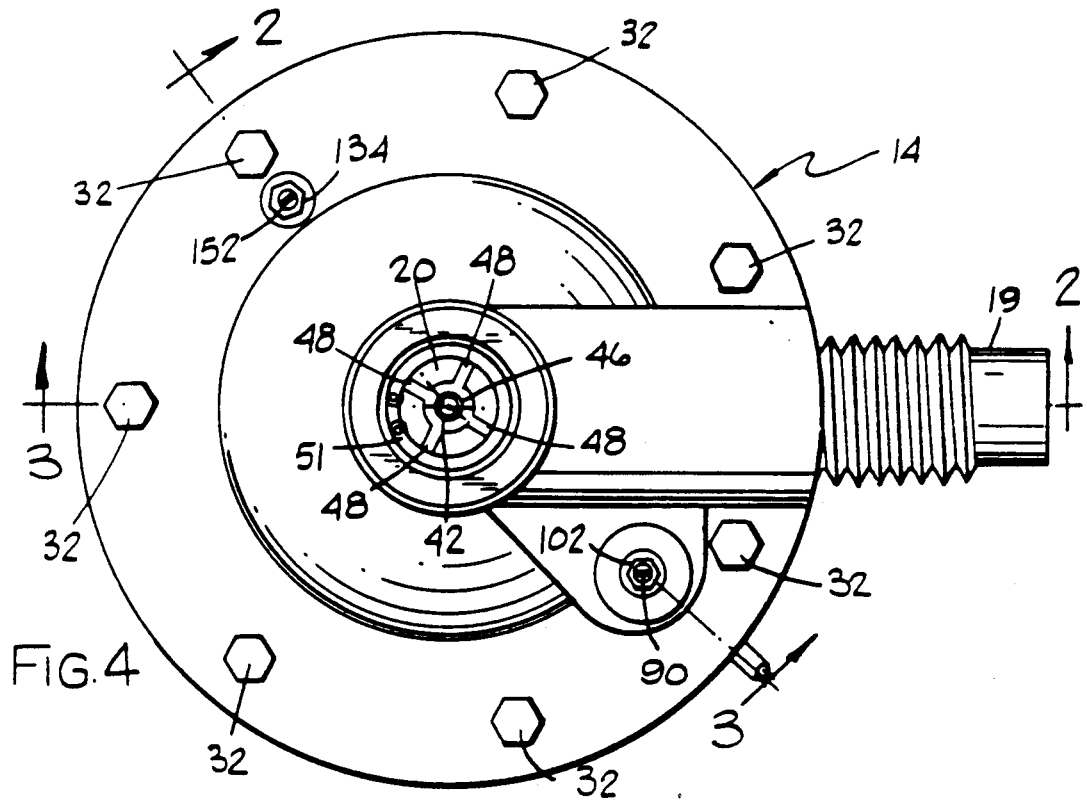
FIG. 4 is a top plan view of the valve of FIG. 1.

Interior wall 16 of housing 14 also defines a valve seat 36 which surrounds the entrance of outlet 20. Valve seat 36 sealingly engages with a valve closing means of the valve (not numbered) to prevent fluid from flowing through valve 10 out through outlet 20. The valve closing means includes a stem 38 having a first end 40 and a second free end 42. First end 40 is attached to diaphragm 26 by bolt means 44 in a conventional manner that need not be explained herein. Second free end 42 is mounted or centered in outlet 20 for axial movement along the axis of outlet 20 by a stem centerer 46 or stem centering means. Stem centerer 46, as best illustrated in FIGS. 3 and 4, is secured to the walls of outlet 20 by a snap ring 51. The centerer four legs 48 and a bore 50 for slidably receiving second free end 42 along the outlet's axis. As such, the aforementioned axial movement of stem 38 along the outlet's axis is facilitated.

The valve closing means also includes a valve disk 52 which is fixedly mounted on the midsection of stem 38 by conventional fastening means 54. Disk 52 has an elastomeric sealing surface 56 for fluid tight sealing engagement with valve seat 36.

Underhead valve 10 also includes fluid pressure control means for controlling fluid pressure in lower chamber 24 to deflect diaphragm 26 upwardly and downwardly to move valve disk 52 in and out of sealing engagement with valve seat 36. The fluid pressure control means includes a first channel (not numbered) defined by housing 14 and an on/off solenoid activated valve 60 located in the first channel for controlling fluid flow therethrough. The first channel has five sections, i.e., section 62, 64, 66, 68 and 70 for conducting fluid therethrough. First section 62 is in fluid communication with inlet 18 which receives pressurized water or fluid from a source thereof. Second section 64 is in fluid communication with first section 62 and lower chamber 24. Third section 66 is in fluid communication with second section 64 and fourth section 68. Similarly, fourth section 68 is in fluid communication with third section 66 and fifth section 70. Fifth section 70 is, in turn, in fluid communication with outlet 20.

When closed, solenoid activated valve 60 is located in third section 66 at the end thereof adjacent fourth section 68. As such, fluid flow through all sections of the first channel is prevented. However, fluid from inlet 18 is permitted to flow through sections 62 and 64 into the lower chamber since the closing of valve 60 does not obstruct sections 62 and 64 as such is illustrated in FIG. 5. Thus, when valve 60 is closed fluid pressure in the lower chamber will rise as it fills with fluid. This increase in pressure causes diaphragm 26 to deflect upwardly into the upper chamber, thereby closing the valve assembly as such is illustrated in FIGS. 2, 3 and 5. When valve 60 is opened by activating a solenoid 72, valve 60 moves downwardly out of third section 66 towards solenoid 72. The opening of valve 60 puts first channel sections 66 and 68 into fluid communication with each other, thereby allowing fluid to flow through the first channel from both inlet 20 and lower chamber 24.

The flow or escape of fluid from lower chamber 24 (i.e., via second channel section 64) causes water pressure in lower chamber 24 to drop slightly (i.e., relative to the water pressure in upper chamber 22). This slight pressure drop, in turn, causes diaphragm 24 to deflect downwardly into lower chamber 24 (as such is depicted in phantom in FIG. 2) which moves valve disk 52 out of sealing engagement with valve seat 36. As such, underhead valve 10 is opened to permit fluid flow through the valve, i.e., through inlet 18, upper chamber 22 and out through outlet 20.

The operation or activation of solenoid 72 is quite conventional and need not be discussed in detail herein. However, it will be appreciated that solenoid 72 is wired to a power source (not shown) via wires 74 and 76 which pass through a bore 78 extending through the lower half 34 of housing 14. It will also be appreciated that wires 74 and 76 are sealed to housing 14 by conventional sealing means 80 to prevent fluid in lower chamber 24 from leaking out through bore 78. Sealing means 80 is also conventional and need not be discussed herein.

Underhead valve 10 also includes flow control means (not numbered) referred to herein as first channel flow control means for regulating (or restricting) fluid flow through the first channel. The first channel flow control means includes an inner needle valve 82 which is threadably received and coaxially aligned in a threaded chamber 84 of an outer needle-like sleeve 86. Outer needle-like sleeve 86 is, in turn, threadably received in a threaded sleeve bore 88 defined by upper half 30 of housing 14. Inner needle valve 82 has an outer end 90 for engagement with a turning means such as a nut driver or screwdriver (not shown) and an inner needle-like end 92 for impeding fluid flow through the first channel. Inner needle-like valve 82 also has a lower portion 94 which extends through a narrow section 96 of a second channel (not numbered) defined by housing 14. Narrow section 96 has a lower (or second) end (not numbered) which is in fluid communication with first section 62, as illustrated in FIG. 5. As such, those skilled in the relevant art will appreciate that the inner needle-like end 92 of needle valve 82 can be lowered or projected into section 62 to control or restrict fluid flow through the first channel. In most cases, it will not be necessary to restrict flow through the first channel. However, such may be come necessary if the in-line water pressure in inlet 18 is so high that it prevents water in lower chamber 24 from escaping when solenoid activated valve 60 is opened.

Underhead valve 10 also includes means for manual operation should solenoid valve 60 fail and remain closed for whatever reason. The manual operation means includes the previously mentioned second channel also referred to herein as a bypass channel and second channel flow control means located in the second channel for controlling fluid flow therethrough. The second channel includes the previously mentioned narrow section 96, a frustoconically shaped section 98 and an outlet section 100. Narrow section 96 is axially aligned with the frustoconical shaped section so that its upper (or first end) is in fluid communication with the smaller diameter end of the frustoconically shaped section 98. The larger diameter end of frustoconically shaped section 98 is axially aligned with sleeve bore 88. Outlet section 100 is in fluid communication with frustoconically shaped section 98 and with section 70 of the first channel. Section 70, as previously mentioned, is in fluid communication with outlet 20.

The second channel flow control means includes the previously mentioned outer needle-like sleeve 86. Sleeve 86 is provided with an upper end or first end 102 (preferably hex-shaped) for engagement with a turning means such as a wrench. In FIG. 1, it can be seen that sleeve 86 is provided with a length so that upper end 102 is flush with the upper surface of sprinkler head 12. This makes it easy to access end 102 for manual operation of the valve should such become necessary.

Returning to FIG. 5, it can also be seen that sleeve 86 is also provided with a lower (or second) frustoconically shaped end 104 which is sized and configured to mate and thus sealingly engage with frustoconically shaped section 98. As such, those skilled in the relevant art will appreciate that fluid flow can be directed through the second channel to outlet 20 by turning outer needle-like sleeve 86 with a wrench so that its frustoconically shaped end 104 is withdrawn a distance from frustoconically shaped section 98. The space between the two frustoconically shaped surfaces provides a channel for fluid flow which allows fluid in lower chamber 24 to back flow or escape through section 64 and the second channel to outlet 20. Thus, the actual path of fluid flow from lower chamber 24 would be through section 64, narrow section 96, frustoconically shaped section 98, outlet section 100 and section 70 of the first channel to outlet 20.

Underhead valve 10 also includes sealing means (not numbered) for preventing fluid from leaking through sleeve bore 88. The sealing means includes a 15 conventional sealing gasket ring 108 located around or about outer needle-like sleeve 86 and a cap 110 which threads onto a male threaded projection 112 of housing 14. When tightened, cap 110 causes gasket 108 to sealingly engage sleeve 86 to prevent fluid from leaking through sleeve bore 88. Underhead valve 10 also includes another sealing means or sealing ring gasket 114 located in sleeve 86 about needle valve 82 which prevents fluid from leaking out of the valve through bore 84.

Valve assembly 10 also includes a diaphragm deflection control means (not numbered) for controlling the deflection of diaphragm 26 into lower chamber 24 to control fluid flow through the valve. The diaphragm deflection control means includes the previously mentioned diaphragm retainer 28 which is mounted in lower chamber 24 and attached to housing 14 by clamping its outer edge (not numbered) between diaphragm 26 and lower half 34 of housing 14 with bolt means 32 as previously described. Fluid leakage between lower half 34 and diaphragm retainer 28 is prevented by a conventional sealing ring gasket 116 which is located in the edge of lower half 30 which is adjacent diaphragm retainer 28. Diaphragm retainer 28 is sized and configured, i.e., somewhat cup-shaped, to limit downward deflection of diaphragm 26 to prevent the diaphragm from rupturing. Diaphragm retainer 28 also defines air slots 118 for allowing passage of any air trapped in the lower chamber.

The diaphragm control means also includes a stem 120 which is axially aligned with stem 28. Stem 120 has an upper free end 122 for contacting the diaphragm to limit downward deflection thereof. Stem 120 also has a lower threaded end 124 which is threadably received in a threaded bore 126 defined by diaphragm retainer 28.

The diaphragm control means further includes an elongated stem 128 which is rotatably received in a bore 130 defined by housing 114. Bore 130 extends from the 15 interior surface of lower chamber 24 to the exterior surface of housing 14. Elongated stem 128 extends through bore 130 so that its lower portion 132 projects into lower chamber 24 and so that its upper end 134 projects outside of housing 14. As best illustrated in FIG. 1, stem 128 is provided with a length so that upper end 134 is flush with the upper surface of sprinkler head 12. Upper end 134 is also hex shaped as best illustrated in FIG. 4. As such, upper end 134 is capable of engagement with an appropriate turning means such a wrench for rotating stem 128 within bore 130. As also illustrated in FIG. 1, both stem 128 and outer needle-like sleeve 86 are secured to sprinkler head 12 by a clamping bracket 135. While not shown, clamping bracket 135 includes means such as a bearing for facilitating rotatable movement of both stem 128 and sleeve 86.

Returning now to FIG. 2, it can be seen that stem 128 is also provided with a sealing ring gasket 136. The ring gasket is located about the stem's midsection in housing 14. As such, the gasket serves to prevent fluid in lower chamber 24 from leaking through bore 130. FIG. 2 also illustrates that the lower end 138 of stem 128 is rotatably received in another bore 140 provided in housing 14. Bore 140 serves to prevent lateral movement of lower end 138 in lower chamber 24.

The deflection control means further includes a first gear 142 which is fixedly mounted on a lower portion 132 of stem 128 and axially aligned therewith. A second gear 144 is also provided which is fixedly mounted on the lower end 124 of stem 120 and axially aligned therewith. Second gear 144 is sized and configured, i.e., provided with teeth (not numbered) which engage or mesh with the teeth (not numbered) of first gear 142. As such, rotatable movement of elongated stem 128 and first gear 142 causes second gear 144 and stem 120 to rotate and move axially along the axis of stem 120 to and from stem 38 of the valve closing means. Such axial movement enables the position of the upper free end 122 of stem 120 to be adjusted which, in turn, enables control over the degree to which the diaphragm is capable of deflecting. For example, if upper free end 122 is positioned relatively high within lower chamber 24, downward deflection of diaphragm 26 will be quite limited. As such, valve disk 52 will be quite close to valve seat 36 and, thereby restrict fluid flow through the valve. On the other hand, if free end 122 is located relatively low within lower chamber 24, diaphragm 26 will be able to deflect quite a distance into lower chamber 24. This will space valve disk 52 quite a distance from valve seat 36, thereby allowing high volume fluid flow through the valve.

Elongated stem 128 also defines an air bleed channel 146 having a bleed inlet 148 and a bleed outlet 150. Bleed inlet 148 is in fluid communication with lower chamber 24 and defined through the surface of stem 128 so that it extends through the midsection of stem 128 at a point adjacent the inner wall of housing 14 which permits it to collect any air trapped in lower chamber 24. Bleed outlet 150 extends through upper end 138 of stem 128 and includes threads for threadably receiving a threaded bleed screw 152. When loosely received in bleed outlet 150, bleed screw 152 will permit any air trapped in lower chamber 24 to bleed through channel 146. Any air trapped under diaphragm 26 will pass through the previously mentioned air slots 118 to channel 146. The bleeding of all or most of the air out of lower chamber 24 is indicated when a steady stream of water flows out of bleed outlet 150. When such is indicated, bleed screw 152 can be tightened to prevent further flow of water out of lower chamber 24.

Underhead valve 10 also includes drainage means (not numbered) for draining lower chamber 24 of fluid when the fluid pressure in upper chamber 22 drops below a predetermined level. Such a pressure drop would occur when, for example, the in-line water pressure supply is shut off. The water supply is typically shut off every year before the start of winter so that the irrigator can blow water out of all water lines, valves and sprinkler heads in the irrigation system. As is well known, any water left in such components can and usually will crack the components when it freezes. The blowing of air through underhead valve 10 removes water from upper chamber 32. The water is blown out of the upper chamber through outlet 20 and out through sprinkler head 12.

While such blowing removes water from the upper chamber, it does not remove water from lower chamber 24. Accordingly, the drainage means of the present invention is provided to drain water from lower chamber 24. The drainage means includes pressure responsive means in fluid communication with the upper chamber for sensing when the fluid pressure the upper chamber drops to a predetermined level such as 10 psi (which would typically indicate that the in-line water supply to valve 10 has been shut off) and for opening a drainage valve 154 which, when closed, covers and sealingly engages with a port 156 defined through the bottom of housing 14. Accordingly, when valve 154 is opened, water in lower chamber 24 drains out through the now uncovered or opened port 156.

The pressure responsive means includes a cylindrical chamber 158 defined by housing 14 which is in fluid communication with upper chamber 22 via a channel 160. Also included is a piston 162 located in cylindrical chamber 158 for slidable movement in the chamber when the in-line water pressure drops to the predetermined level. The piston also has sealing rings (not shown) which prevent fluid leakage between the piston and the chamber walls. The rings make the piston sensitive to changes in water pressure in inlet 18 so that the piston is capable of moving when the pressure drop is sensed. The pressure responsive means also includes a bore 164 in fluid communication with cylindrical chamber 158 and lower chamber 24. A shaft 166 is slidably received in bore 164 and attached at a first end thereof to piston 162 and attached at a second end thereof to drainage valve 154. In addition, the pressure responsive means includes a coil spring or spring means 168 which is located over the second end of shaft 166 and drainage valve 154. Coil spring 168 has a first or lower end (not numbered) which abuts against the interior wall of housing 14 about the entrance of drainage port 156. Coil spring 168 also has a second or upper end (not numbered) which abuts against a collar 169 provided on shaft 166. Collar 169 is located on shaft 166 at a location which is predetermined to cause the coil spring to recoil when fluid pressure in upper chamber 22 drops to the predetermined level. The recoiling of the spring 168 causes the entire connected assembly i.e. piston 162, shaft 166 and valve 154 to move upwardly, thereby exposing or opening port 156 to permit fluid to drain out of lower chamber 24 through the port. A filter or filter means 170 is also disposed in channel 160 between upper channel 22 and cylindrical chamber 158 to prevent dirt from entering cylindrical chamber 158.

Other features of this invention will appear in the following description and appended claims reference being made to the accompanying drawings forming a part of the specification where like reference characters designate corresponding parts and the views.

I claim:

1. In an improved irrigation system of the type having a sprinkler head and fluid supply means for supplying the sprinkler head with fluid, wherein the improvement comprises a remote controllable valve assembly including:

a housing having interior walls defining an inner chamber, an inlet in fluid communication with said inner chamber, an outlet in fluid communication with said inner chamber and a valve seat surrounding the entrance of said outlet, said inlet also being in fluid communication with said fluid supply means, said outlet also being in fluid communication with said sprinkler head;

a flexible diaphragm extending across said inner chamber and being attached to said interior walls thereof so as to divide said inner chamber into an upper chamber and a lower chamber wherein said upper chamber is in fluid communication with said inlet and said outlet;

valve closing means located in said upper chamber and attached to said diaphragm for sealing engagement with said valve seat to stop fluid flow through said outlet to said sprinkler head;

means for remotely controlling fluid pressure in said lower chamber to deflect said diaphragm upwardly and downwardly for purposes of moving said valve closing means in and out of sealing engagement with said valve seat, thereby opening and closing said valve assembly; and diaphragm deflection control means for controlling the deflection of said diaphragm into said lower chamber to control fluid flow through said valve assembly.

2. An irrigation system as claimed in claim 1 further comprising:

means for draining said lower chamber of fluid when fluid pressure in said upper chamber drops below a predetermined level.

3. An irrigation system as claimed in claim 1 further comprising means for bleeding air out of said lower chamber.

4. An irrigation system comprising:
a sprinkler head;
fluid supply means; and
a remote controllable valve assembly which is removably connected to the underside surface of said sprinkler head, said valve assembly including:
a housing having interior walls defining an inner chamber, an inlet in fluid communication with said inner chamber, an outlet in fluid communication with said inner chamber and a valve seat surrounding the entrance of said outlet, said inlet also being in fluid communication with said fluid supply means, said outlet also being in fluid communication with said sprinkler head;
a flexible diaphragm extending across said inner chamber and being attached to said interior walls thereof so as to divide said inner chamber into an upper chamber and a lower chamber wherein said upper chamber is in fluid communication with said inlet and said outlet;
valve closing means located in said upper chamber, said valve closing means including:
a stem having a first end attached to said diaphragm, a second end and a central section located between said first and said second ends;
a valve disk mounted on said central section of said stem for sealing engagement with said valve seat to stop fluid flow through said outlet to said sprinkler head; and
stem centering means mounted in said outlet, said centering means defining a stem bore for slidably receiving said second end of said stem to maintain said valve disk in alignment with said valve seat so that said valve disk is capable of sealing engagement with said valve seat to stop fluid flow through said outlet; and means for remotely controlling fluid pressure in said lower chamber to deflect said diaphragm to open and close said valve assembly, said fluid pressure control means including:
a first channel defined by said housing in fluid communication with said inlet, said outlet and said lower chamber; and
an on/off solenoid activated valve located in said first channel between said outlet and said lower chamber for lowering fluid pressure in said chamber to deflect said diaphragm inwardly towards said lower chamber to open said valve assembly, said opened solenoid valve lowering fluid pressure in said lower chamber by enabling fluid in said lower chamber to escape through said outlet via said first channel.

5. An irrigation system as claimed in claim 4 further comprising first channel flow control means located in said first channel between said inlet and said lower chamber for regulating fluid flow through said first channel, said first channel flow control means enabling fluid pressure in said lower chamber to be lowered by being operable to reduce the flow rate of fluid through said first channel so that fluid escapes from said lower chamber to said outlet when said solenoid valve is opened, the escape of such fluid thereby lowering water pressure in said lower chamber.

6. An irrigation system as claimed in claim 5 further comprising manual operation means including a second channel defined by said housing and second channel flow control means located in said second channel, said second channel being in fluid communication with said first channel at a location between said inlet and said solenoid valve, said second channel also being in fluid communication with said first channel at a location between said solenoid valve and said outlet, said second channel flow control means being operable to control fluid flow through said second channel to said outlet so that fluid escapes from said lower chamber to said outlet via said first and second channels, the escaping fluid thereby lowering fluid pressure in said lower chamber.

7. An irrigation system as claimed in claim 6 wherein said first channel flow control means includes an inner needle valve and said second channel flow control means includes an outer-needle-like sleeve, said outer needle-like sleeve defining a threaded chamber for threadably receiving said inner needle valve so that said inner needle valve and said outer needle-like sleeve are coaxially aligned and capable of axial movement with respect to each other, said inner needle valve having an outer end for engagement with second turning means and an inner needle-like end for impeding fluid flow through said first channel, said outer needle-like sleeve having a first end for engagement with third turning means, a second frustoconical shaped end and a threaded central section located between said first end and said second frustoconically shaped end, said valve assembly further including a threaded sleeve bore defined by said housing which extends from the exterior of said housing to said second channel, said threaded sleeve bore threadably receiving said threaded central section of said outer needle-like sleeve, said threaded sleeve bore also being axially aligned and in fluid communication with the larger diameter end of a frustoconically shaped section of said second channel, said frustoconically shaped section being sized and configured to sealingly engage with said second frustoconically shaped end of said outer needle-like sleeve to stop fluid flow through said second channel, said frustoconically shaped section also being in fluid communication with said outlet, said second channel also having a narrow section for receiving a lower portion of said inner needle valve, said narrow section being axially aligned with said frustoconically shaped section and having a first end in fluid communication with the smaller diameter end of said frustoconically shaped section, said narrow section also having a second end in fluid communication with said first channel, said narrow section also having a length which enables said inner needle end of said inner needle valve to project into said first channel, said outer needle-like sleeve being threadably received in said threaded section of said sleeve bore so that said outer end of said inner needle valve and said first end of said outer needle-like sleeve project outwardly from said housing, said outer end capable of being engaged by said second turning means and said first end of said outer needle-like sleeve capable of being engaged by said third turning means, said second turning means enabling said needle end of said inner needle valve to be adjustable positioned within said first channel to regulate fluid flow through said first channel, said third turning means enabling said second frustoconical shaped end of said outer needle-like sleeve to be adjustably positioned relative to said frustoconically shaped section of said second channel to regulate and stop fluid flow through said second channel.

8. An irrigation system as claimed in claim 7 further comprising second and third sealing means, said second sealing means preventing fluid flow between said inner needle valve and said outer needle-like sleeve, said third sealing means preventing fluid flow between said outer needle-like sleeve and said sleeve bore.

9. An irrigation system as claimed in claim 4 further comprising:
diaphragm deflection control means for controlling the deflection of said diaphragm into said lower chamber to control fluid flow through said valve assembly.

10. An irrigation system as claimed in claim 9 wherein said diaphragm deflection control means includes:
a diaphragm retainer mounted in said lower chamber, said diaphragm retainer being sized and configured to limit downward deflection of said diaphragm to prevent said diaphragm from rupturing;
a second stem axially aligned with said first stem and having an upper free end for contacting said diaphragm to limit downward deflection thereof, said second stem also having a lower threaded end which is threadably received in a threaded bore defined by said diaphragm retainer;
an elongated third stem rotatably received in a first bore defined by said housing, said first bore extending from the interior surface of said lower chamber to the exterior surface of said housing, said elongated third stem extending through said bore so as to have a lower portion projecting into said lower chamber and an upper end projecting outside of said housing, said upper end capable of being engaged by a first turning means for rotating said third stem within said bore;
first sealing means for sealing said third stem to said bore to prevent fluid in said lower chamber from leaking through said bore;
a first gear fixedly mounted on and axially aligned with said lower end of said elongated third stem; and
a second gear fixedly mounted on and axially aligned with said lower end of said second stem, said second gear also being sized and configured to engage said first gear so that rotatable movement of said third stem and first gear causes said second gear and said second stem to rotate and move axially to and/or from said first stem, such movement thereby enabling the position of said free end to be adjusted which, in turn, enables control over the degree to which said diaphragm is capable of deflecting.

11. An irrigation system as claimed in claim 10 wherein said diaphragm retainer defines air slots for allowing the passage of air trapped in said lower chamber and wherein said elongated third stem defines an air bleed channel having a bleed inlet and a threaded bleed outlet, said threaded bleed outlet located through said open end of said third stem for threadably receiving a threaded bleed screw, said bleed inlet being in fluid communication with said lower chamber and defined through the surface of said third stem so that said bleed inlet extends through the midsection of said third stem at a point which permits said bleed inlet to collect air trapped in said lower chamber and bleed it through said bleed outlet, said bleed screw being capable of engagement with a turning means to loosely thread said bleed screw in said bleed outlet, said bleed screw also being capable of tight sealing engagement with said bleed outlet to prevent fluid flow through said bleed outlet.

12. An irrigation system as claimed in claim 4 further comprising:
means for draining said lower chamber of fluid when fluid pressure in said upper chamber drops below a predetermined level.

13. An irrigation system as claimed in claim 12 wherein said means for draining includes:
a drainage port in fluid communication with said lower chamber which extends through said housing;
a drainage valve for sealable engagement with said drainage port; and
pressure responsive means in fluid communication with said upper chamber for sensing when the fluid pressure in said upper chamber drops below the predetermined level and for opening said drainage valve when the fluid pressure drops below the predetermined level.

14. An irrigation system as claimed in claim 13 wherein said pressure responsive means includes:
a cylindrical chamber defined by said housing in fluid communication with said upper chamber;
a piston for slidable movement within said cylindrical chamber;
a second bore in fluid communication with said cylindrical chamber and said lower chamber;
a shaft slidably received in said second bore and having a first end attached to said piston and a second end attached to said drainage valve; and
spring means located over said second end of said shaft and said drainage valve, said spring means having a first end attached to said interior wall of said housing about the entrance of said drainage port, said spring means also having a second end attached to said shaft at a location which is predetermined to cause said spring means to recoil when the fluid pressure in said upper chamber drops below the predetermined level, the recoiling of said spring means causing said shaft to move which, in turn, opens said drainage valve, thereby draining fluid out of said lower chamber.

15. An irrigation system as claimed in claim 14 wherein said pressure responsive means further includes filter means disposed in a third channel in fluid communication with said upper chamber and said cylindrical chamber.

16. An irrigation system as claimed in claim 4 further comprising means for bleeding air out of said lower chamber.

* * * * *